(12) United States Patent
Freda

(10) Patent No.: US 9,650,750 B1
(45) Date of Patent: May 16, 2017

(54) ANIMAL WASTE COLLECTING DEVICE

(71) Applicant: Carmine Freda, Washington, NJ (US)

(72) Inventor: Carmine Freda, Washington, NJ (US)

(*) Notice: Subject to any disclaimer, the term of this patent is extended or adjusted under 35 U.S.C. 154(b) by 0 days.

(21) Appl. No.: 14/742,793

(22) Filed: Jun. 18, 2015

Related U.S. Application Data

(60) Provisional application No. 62/077,381, filed on Nov. 10, 2014.

(51) Int. Cl.
*A01K 29/00* (2006.01)
*E01H 1/12* (2006.01)

(52) U.S. Cl.
CPC ....... *E01H 1/12* (2013.01); *E01H 2001/1293* (2013.01)

(58) Field of Classification Search
CPC . E01H 1/12; E01H 2001/1293; E01H 1/1206; A01K 23/005
USPC ........................................... 294/1.5, 1.3, 1.4
See application file for complete search history.

(56) References Cited

U.S. PATENT DOCUMENTS

| | | | |
|---|---|---|---|
| 5,634,678 A * | 6/1997 | Bailey | A01K 23/005 294/1.5 |
| 5,676,411 A | 10/1997 | Kwok | |
| 5,971,452 A | 10/1999 | Marymor et al. | |
| 7,090,268 B2 | 8/2006 | Borman | |
| 7,854,455 B2 | 12/2010 | Ruscil et al. | |
| 7,954,868 B1 * | 6/2011 | Van Pelt | A01K 23/005 294/1.5 |
| 8,469,418 B2 * | 6/2013 | Dougherty | A01K 23/005 119/161 |
| 8,511,728 B2 | 8/2013 | Beaton | |
| 2002/0194772 A1 * | 12/2002 | Akhtar | A01K 23/005 43/107 |
| 2008/0116704 A1 * | 5/2008 | Botello | A01K 23/005 294/1.5 |

* cited by examiner

*Primary Examiner* — Gabriela Puig
(74) *Attorney, Agent, or Firm* — Global Intellectual Property Agency, LLC; Daniel Boudwin

(57) ABSTRACT

An animal waste collecting device for collecting and disposing of animal waste. The animal waste collecting device includes a rigid, elongated handle having a first end and a second end, wherein the first end includes an eyelet thereon so as to allow the elongated handle to be hung from a hook or similar support. The second end is removably secured to a bag and cable tie assembly, wherein the cable tie is configured in a loop and secured to the open upper end of the bag. The bag is used to collect animal waste, wherein the rigidity of the cable tie allows the bag to remain open. The cable tie is pulled through a locking mechanism in order to seal the bag after animal waste has been collected therein. The cable tie assembly is removably secured to the second end of said elongated handle by a clip.

4 Claims, 5 Drawing Sheets

ANIMAL WASTE COLLECTING DEVICE

CROSS REFERENCE TO RELATED APPLICATION

This application claims the benefit of U.S. Provisional Application No. 62/077,381 filed on Nov. 10, 2014. The above identified patent application is herein incorporated by reference in its entirety to provide continuity of disclosure.

BACKGROUND OF THE INVENTION

Field of the Invention

The present invention relates to animal waste collecting devices. More specifically, the present invention provides an animal waste collecting device comprising an elongated handle having a first end and a second end, wherein the first end includes an eyelet thereon and the second end removably secures to a bag and cable tie assembly by a clip disposed thereon. The cable tie is disposed in a loop configuration and is secured to the open upper end of the bag, wherein the bag is adapted to receive waste therein. The cable tie allows the bag to remain in an open configuration and is adapted to seal the bag once animal waste has been collected therein. The clip is adapted to detach the bag, cable tie, and waste therein from the second end of the elongated handle for disposal.

Pet owners and animal caretakers take their pets for regular walks outdoors for exercise and to allow the animal to relieve oneself. Typically, the area in which a person walks his or her dog is a location shared by many other people, such as a park or neighborhood. It is important for pet owners to pick up after their dogs in order to maintain the cleanliness of parks and communities. Many communities require removal of animal waste or a pet owner consequently receives a fine if he or she chooses to leave the waste behind. Therefore, a pet owner generally carries a plastic bag while walking the dog in order to collect the dog's waste. However, it is unsanitary and very unpleasant for the pet owner or animal caretaker to collect the waste using his or her hand protected only by a plastic bag. Therefore, there exists a need in the prior art for a device that provides an easier, more convenient method for a pet owner or animal caretaker to collect pet waste and dispose of it thereafter.

It is submitted that the present invention substantially diverges in design elements from the prior art and consequently it is clear that there is a need in the art for an improvement to existing animal waste collecting devices. In this regard the instant invention substantially fulfills these needs.

SUMMARY OF THE INVENTION

In view of the foregoing disadvantages inherent in the known types of animal waste collecting devices now present in the prior art, the present invention provides a new animal waste collecting device wherein the same can be utilized for providing convenience for the user when collecting and disposing of animal waste.

It is therefore an object of the present invention to provide a new and improved animal waste collecting device that has all of the advantages of the prior art and none of the disadvantages.

It is another object of the present invention to provide an animal waste collecting device comprising a rigid, elongated handle having a first end and a second end, wherein the first end includes an eyelet thereon so to allow the elongated handle to be hung on a hook.

Another object of the present invention is to provide an animal waste collecting device wherein the second end of the elongated handle is removably secured to a disposable bag and cable tie assembly, wherein the bag is adapted to collect animal waste therein.

Another object of the present invention is to provide an animal waste collecting device wherein an opening of the disposable bag is secured to the cable tie, wherein the cable tie is disposed in a loop configuration, such that the cable tie holds the bag in an open configuration and is adapted to be pulled through a locking mechanism in order to seal the bag after collecting waste therein.

Yet another object of the present invention is to provide an animal waste collecting device further comprising a clip having a male end and a female end, wherein the female end is connected to the second end of the elongated handle and the male end is connected to the cable tie.

Another object of the present invention is to provide an animal waste collecting device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
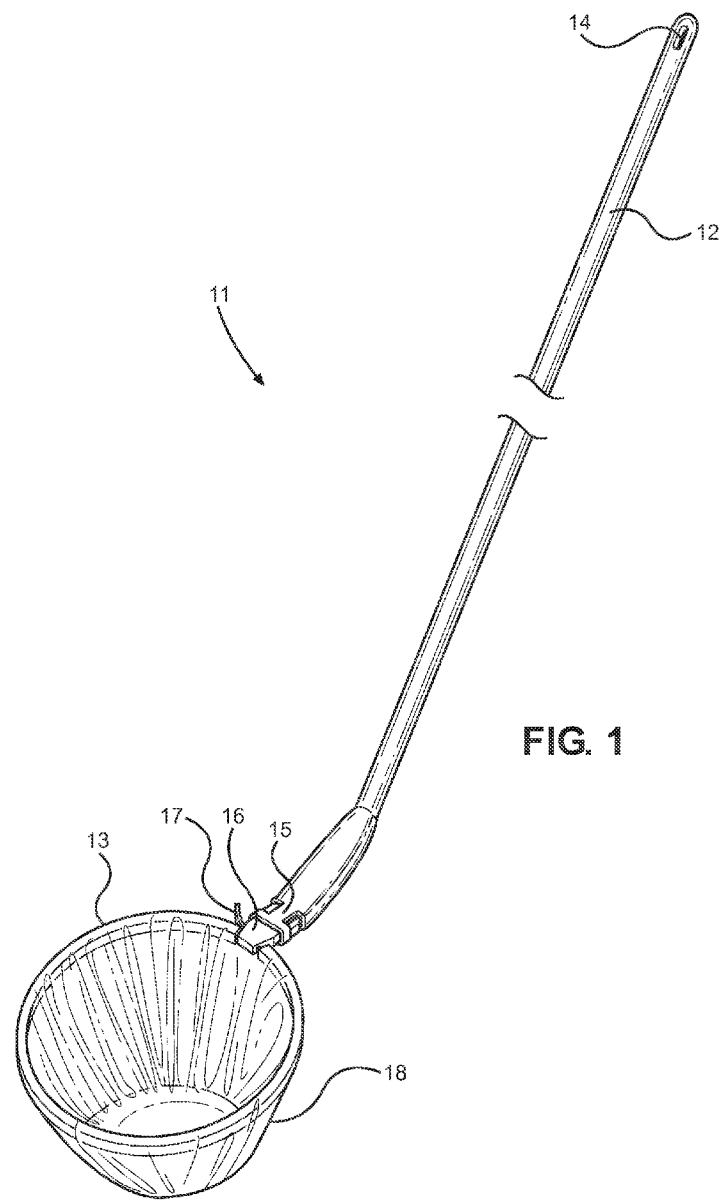
FIG. 1 shows a perspective view of an embodiment of the animal waste collecting device wherein the bag is in an open configuration.

Reference is made herein to the attached drawings. Like reference numerals are used throughout the drawings to depict like or similar elements of the animal waste collecting device. For the purposes of presenting a brief and clear description of the present invention, the preferred embodiment will be discussed as used for collecting and disposing of animal waste. The figures are intended for representative purposes only and should not be considered to be limiting in any respect.

Figure 2:
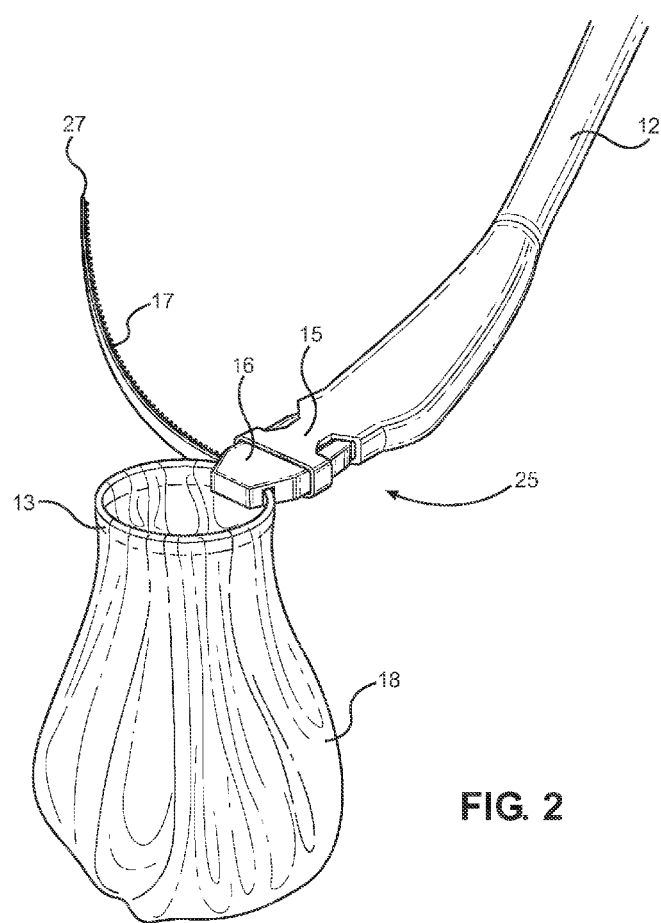
FIG. 2 shows a close up view of the lower end of the animal waste collecting device wherein the bag is in a closed configuration.

Referring now to FIGS. 1 and 2, there is shown a perspective view of an embodiment of the animal waste collecting device wherein the bag is in an open configuration and a close up view of the lower end of the animal waste collecting device wherein the bag is in a closed configuration, respectively. The animal waste collecting device 11 comprises a rigid, elongated handle 12 having a first end and a second end. The first end of the handle 12 includes an eyelet 14 thereon so to allow the elongated handle 12 to be hung on a hook. The handle 12 preferably comprises a circular cross section in order to provide a comfortable grip to a user.

In some embodiments, the handle 12 is telescopic so that it can be adjusted in length. In such embodiments, the handle 12 comprises a first rod adapted to fit over a second rod, wherein one or more apertures are disposed along the length of the first rod and second rod. An aperture disposed on each rod are adapted to align at the desired length of the handle and receive a fastener therethrough, such that the handle 12 remains at the desired length.

The animal waste collecting device 11 further comprises a clip 25 that removably secures the second end of the elongated handle 12 to a cable tie 17 assembly, wherein the cable tie 17 assembly is adapted to receive a disposable bag thereon. The bag 18 comprises a base, one or more sidewalls, and an open upper end 13, defining an interior volume. The open upper end 13 of the bag 18 is adapted to receive animal waste therein.

The animal waste collecting device 11 further comprises a cable tie 17 adapted to secure to the periphery of the open upper end 13 of the bag 18. The cable tie 17 comprises an elongated strap disposed in a loop configuration, wherein the cable tie 17 includes a first end 27, a second end, and an outer surface. The cable tie 17 forms a rigid loop around the open upper end 13 of the bag 18, thereby allowing the bag 18 to remain in an opened configuration. In the illustrated embodiment, the upper end 13 of the bag 18 forms a channel therearound, wherein the cable tie 17 is disposed therein and allowed to freely pass therethrough. However, in other embodiments, any suitable disposable bag 18 can be used to secure to the cable tie 17 assembly.

Figure 3:
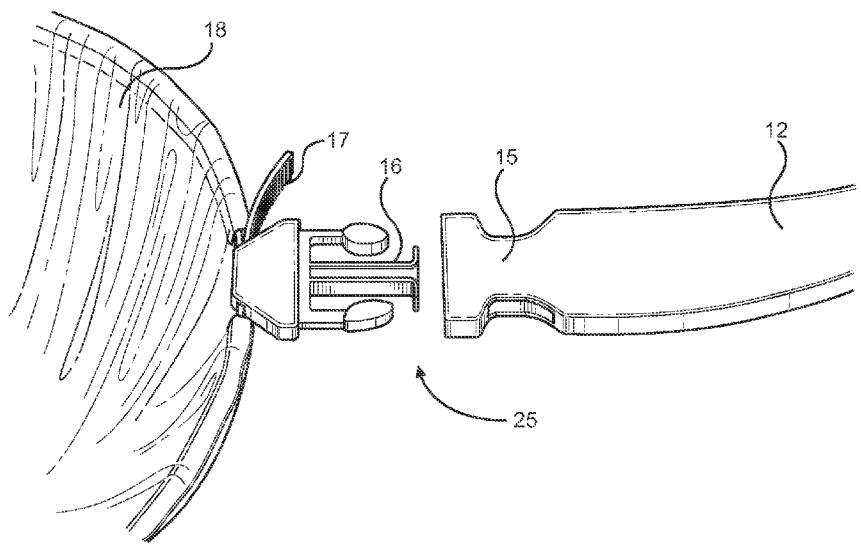
FIG. 3 shows a perspective view of the bag and cable tie assembly detached from the elongated handle of the animal waste collecting device.

Referring now to FIG. 3, there is shown a perspective view of the bag and cable tie assembly detached from the elongated handle of the animal waste collecting device. The clip 25 comprises a male end 16 removably secured to a female end 15, wherein the female end 15 is connected to the second end of the elongated handle 12 and the male end 16 is connected to the cable tie 17. The female end 15 can be connected to the second end of the elongated handle 12 by any suitable fastener, such as adhesive, or the ends can be integral to one another. The male end 16 is adapted to detach from the female end 15 of the clip 25, thereby allowing for the separation of the bag 18, cable tie 17, and male end 16 of the clip 25 from the elongated handle 12. The bag 18, cable tie 17, and male end 16 end of the clip 25 are adapted to be disposed of.

Figure 4A:
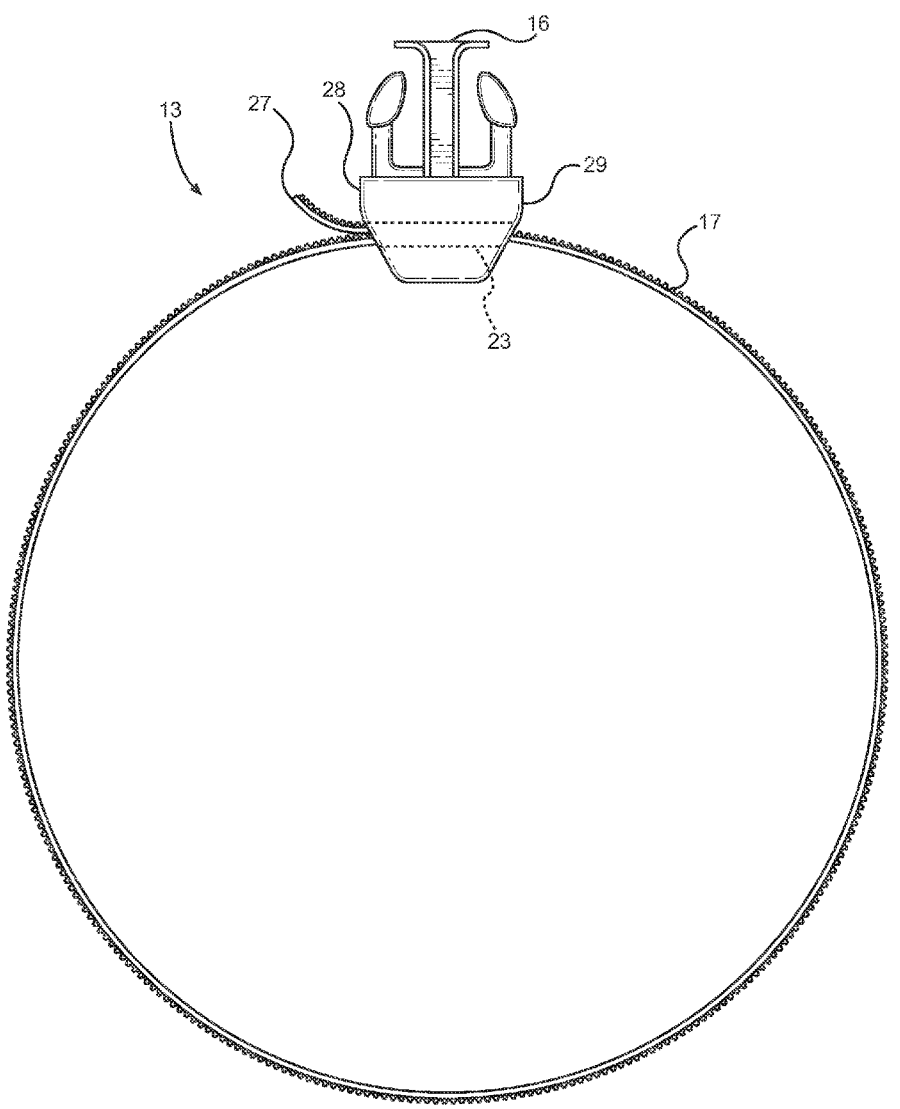
FIG. 4A shows a top down view of the cable tie and the male end of the clip of the animal waste collecting device.
Figure 4B:
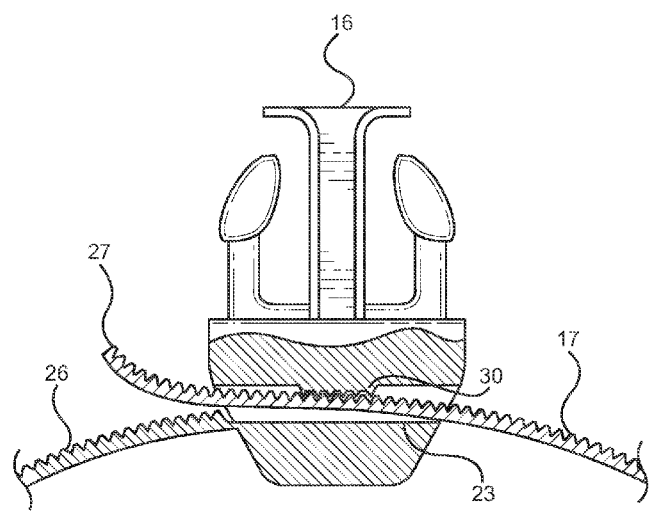
FIG. 4B shows a cross sectional view of the cable tie and the male end of the clip of the animal waste collecting device.

Referring now to FIGS. 4A and 4B, there is shown a top down view of the cable tie and the male end of the clip of the animal waste collecting device and a cross sectional view of the cable tie and the male end of the clip of the animal waste collecting device, respectively. The male end 16 of the clip comprises a first side 28 opposing a second side 29, wherein a channel 23 extends from the first side 28 to the second side 29. The channel 23 is disposed horizontally and the ends of the channel 23 are open in order to receive the first end 27 of the cable tie 17 therethrough. The second end 21 of the cable tie 17 is permanently affixed to the male end of the clip and extends from the first side 28 thereof, whereas the first end of the cable tie is free. The second end 21 of the cable tie 17 and the male end 16 of the clip are integral to one another. In other embodiments, the second end 21 of the cable tie 17 is secured to the male end 16 of the clip by any suitable fastener, such as adhesive.

The first end 27 of the cable tie 17 is disposed through the second side 29 of the male end 16 of the clip and adjustably secured to the channel 23 by a locking mechanism. The locking mechanism comprises one or more pawls 30 disposed on the lateral side of the channel 23 that face the outer surface of the cable tie 17. The pawl 30 comprises a curved end that is adapted to engage the plurality of ridges 26 disposed on the outer surface of the cable tie 17 and adjustably secure the first end 27 of the cable tie 17 to the male end 16 of the clip. The channel 23 allows the first end 27 of the cable tie 17 to pass therethrough, but the shape of the pawl prevents the first end 27 of the cable tie 17 from coming back through the channel 23 once placed therein. The ridges 26 extend the length of the cable tie 17 so as to allow the cable tie 17 to form a smaller and smaller loop as each ridge 26 is pulled through the channel 23 in order to seal the bag disposed thereon.

In operation, the user holds the animal waste collecting device by the elongated handle and positions the bag beneath the rear end of an animal as it is excreting, wherein the bag is in an open configuration. Once the bag receives the animal waste therein, the user pulls the first end 27 of the cable tie 17 until the bag is sealed and is in a closed configuration (as referenced in FIG. 2). As the first end 27 of the cable tie 17 is pulled, the cable tie passes through the channel disposed in the bag. Next, the male end of the clip is detached from the female end, thereby separating the bag from the elongated handle. The user can then dispose of the bag, cable tie, and male end of the clip. A new bag and cable tie assembly is attached to the elongated handle for use.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal waste collecting device, comprising:
    an elongated handle having a first end and a second end;
    a cable tie disposed in a loop configuration, wherein said cable tie comprises a first end and a second end;
    wherein said cable tie is adapted to receive a disposable bag thereon and is adapted to seal said disposable bag in a closed configuration;
    a fastener removably secured between said second end of said elongated handle and said second end of said cable tie;
    wherein said fastener is a clip comprising a male end and a female end, wherein said female end is secured to said second end of said elongated handle and said male end is secured to said second end of said cable tie, such that said male end is removably secured to said female end; and wherein said male end of said clip comprises a channel extending from a first side thereof to a second side thereof, wherein said second end of said cable tie extends from said first side of said male end, wherein said first end of said cable tie is disposed through said second side of said male end and adjustably secured to said channel by a locking mechanism.

2. The animal waste collecting device of claim 1, wherein said first end of said elongated handle comprises an eyelet thereon adapted to allow said elongated handle to be hung on a hook.

3. The animal waste collecting device of claim 1, wherein said locking mechanism comprises a pawl disposed on said channel and said cable tie comprises an outer surface having a plurality of ridges thereon, such that said plurality of ridges are pulled through said channel and engage said pawl, wherein said pawl prevents said plurality of ridges from becoming removed therefrom.

4. The animal waste collecting device of claim 1, wherein said second end of said cable tie and said male end of said clip are integral to one another.

* * * * *